United States Patent [19]

Rice et al.

[11] Patent Number: 5,228,245
[45] Date of Patent: Jul. 20, 1993

[54] NON-MACHINING SURFACE STRENGTHENING OF TRANSFORMATION TOUGHENED MATERIALS

[75] Inventors: Roy W. Rice, Alexandria, Va.; Jyoti P. Chakraverty, Wooster, Ohio

[73] Assignee: W. R. Grace & Co.-Conn., New York, N.Y.

[21] Appl. No.: 848,784

[22] Filed: Mar. 10, 1992

[51] Int. Cl.$^5$ .............................................. B24C 1/10
[52] U.S. Cl. .................................. 51/319; 51/283 R
[58] Field of Search ............ 51/319, 320, 321, 283 R, 51/324, 410; 72/53

[56] References Cited

U.S. PATENT DOCUMENTS

| | | | |
|---|---|---|---|
| 3,828,488 | 8/1974 | Skriletz et al. | 51/319 |
| 4,067,745 | 1/1978 | Garvie et al. | 106/57 |
| 4,287,740 | 9/1981 | Kumar | 72/53 |
| 4,877,638 | 10/1989 | Novak et al. | 427/8 |

FOREIGN PATENT DOCUMENTS

| | | | |
|---|---|---|---|
| 1056203 | 3/1986 | Japan | 72/53 |
| 1240615 | 9/1989 | Japan | 72/53 |
| 0185370 | 7/1990 | Japan | 51/319 |
| 0605844 | 5/1978 | U.S.S.R. | 72/53 |

*Primary Examiner*—Robert A. Rose
*Attorney, Agent, or Firm*—Steven Capella

[57] ABSTRACT

Transformation-toughened material bodies such as transformation-toughened zirconia may be strengthened by grit blasting the body surface. Grit blasting of the surface with a grit material such as alumina or silicon carbide can result in flexural strength increases of at least about 10-20% compared to the body prior to blasting. The method of the invention provides strength increases comparable or better than those resulting from surface grinding and may be used for a broader variety of body shapes.

17 Claims, No Drawings

NON-MACHINING SURFACE STRENGTHENING OF TRANSFORMATION TOUGHENED MATERIALS

BACKGROUND OF THE INVENTION

"Transformation toughening" is a phenomenon which occurs in certain bodies containing small particles or grains of a metastable phase material. The metastable phase leads to toughening when it undergoes a martensitic or other sufficiently fast and energetic transformation to a stable phase at or ahead of a crack tip in the body. Transformation toughening of ceramics is most well known in bodies containing metastable tetragonal zirconia particles or grains where the phase transformation is to a stable monoclinic zirconia phase. Similar transformation toughening has also been shown for certain materials containing hafnia and has been suggested as a possibility in some other ceramic systems.

In materials systems using tetragonal zirconia, transformation toughening is observed in two principal arrangements. The first is where a fine (typically submicron) tetragonal zirconia precipitate is formed in a cubic zirconia matrix. The cubic zirconia usually has a substantial grain size (e.g. 100 $\mu$m) resulting from high temperature treatment to achieve a solid solution of zirconia and a stabilizing compound (typically CaO or MgO). The cubic zirconia with tetragonal precipitate is commonly referred to as partially stabilized zirconia (PSZ).

The second principal occurrence of transformation toughening with zirconia occurs in a material consisting of fine zirconia grains (typically about 0.5-2 $\mu$m) primarily of tetragonal zirconia. This material is obtained by sintering very fine zirconia powder containing only sufficient stabilizer (usually $Y_2O_3$) to achieve the desired tetragonal phase. This tetragonal material is referred to a "TZP".

Transformation toughening using tetragonal zirconia can also occur when fine tetragonal zirconia particles are placed into a compatible material matrix. The most important materials system of this type uses an alpha alumina matrix. This material is referred to as zirconia-toughened alumina (ZTA).

Transformation toughened materials have been shown to undergo an increase in flexural strength when the as-fired surfaces of the body are subjected to grinding. Flexural strength increases due to surface grinding are typically on the order of about 20% for zirconia toughened ceramics. This increase in strength has been attributed to transformation from tetragonal to monoclinic phase at the surface of the body. For example, see U.S. Pat. No. 4,067,745 to Garvie et al. Since the tetragonal to monoclinic phase transformation involves a volume expansion, the transformation to monoclinic at the surface results in a surface compressive stress which is responsible for the strength increase.

While the strength increase associated with machining transformation-toughened materials is desirable, machining is typically one of the most costly operations performed on ceramic materials. Accordingly, machining is normally performed only to achieve dimensional tolerances or surface finish characteristics. Further, in addition to cost considerations, machining may not be practical where the body is intricately shape or where machining would involve unacceptable deviation from dimensional tolerances. Thus, there is a need for a less costly, more widely applicable method of achieving the surface strengthening effect normally associated with the machining of transformation toughened materials.

SUMMARY OF THE INVENTION

The invention provides a method of surface treating transformation toughened materials which can be performed at much less expense in a wider variety of situations to achieve increases in flexural strength comparable to those resulting from machining. The method of the invention involves grit blasting a body made of transformation toughened material to achieve an increase in flexural strength compared to the body just prior to grit blasting.

The grit blasting conditions may vary from material to material or body to body. Alumina and silicon carbide are preferred grit materials. The grit blasting time is preferably about 30 seconds–3 minutes. The blasting pressure is preferably about 40–100 psi. The grit particle feed rate is preferably about 1-2 pounds per minute. The dispersion area of the blast is preferably about 0.5–5 square inches at the blast target.

The invention is especially suitable for surface treating transformation toughened ceramics containing tetragonal zirconia as the toughening constituent such as PSZ, TZP, and ZTA described above. The grit blasting technique of the invention preferably achieves at least about a 10 percent increase in flexural strength, more preferably at least about 20 percent.

DETAILED DESCRIPTION OF THE INVENTION

The basic method of the invention comprises grit blasting a body containing transformation toughened material such that the flexural strength of the material is increased compared to the strength just prior to grit blasting.

The grit blasting conditions used in the invention may be any conditions which achieve the desired strength increase. The conditions may vary depending on the particular transformation toughened material involved, the amount of strength increase desired, the condition of the body itself and possibly other factors.

In general, the grit blasting is preferably performed at a pressure of about 40–100 psi, more preferably about 85–90 psi for alumina grit and about 45–55 psi for silicon carbide grit. The surfaces of the body are preferably subjected to the blasting for about 0.5-3 minutes on average, more preferably about 1-2 minutes on average. The grit particle feed rate is preferably about 1-2 pounds per minute. The dispersion area of the blast is preferably about 0.5-5 square inches measured at the blast target. Any suitable grit material capable of achieving a strength increase may be used. Alumina and silicon carbide are preferred grit materials. The grit size may be any suitable size. Preferably, the grit has an average size of about 25-600 microns.

It should be noted that the grit blasting parameters may be interdependent on one another. For example, an increase in grit feed rate at a given pressure may dictate a change in the grit particle size and/or the exposure time. If it is desired to blast a larger surface area, a larger nozzle opening and/or increased distance from nozzle to target may be used to increase the dispersion area of the blast. In such case, the exposure time and/or particles feed rate would have to be increased to get the same blast effect per unit area of the part being treated.

The body to be grit blasted may be virtually any transformation toughened body. Typically, the body would be blasted after a firing step used to achieve densification (i.e. an as-fired body). If any machining of the body is required to meet dimensional tolerances, the machining is preferably done prior to grit blasting. If such machining is required, the grit blasting is then preferably used at least on any surfaces of the body which did not require machining. The machined surfaces may also be blasted to produce minor increases in surface flexural strength depending on the intensity of the prior machining.

Virtually any size or shape body may be treated according to the invention. The wide applicability of the method of the invention provides a distinct advantage over the use of machining (for increasing flexural strength) since many bodies and/or surfaces may be impractical or impossible to machine.

Any transformation toughened material may be treated by the method of the invention. Transformation toughened ceramics are particularly suitable for treatment. The method of the invention is especially suitable for ceramic materials containing tetragonal zirconia such as PSZ, ZAT and TZP mentioned above.

The percentage increase in flexural strength resulting from the grit blasting treatment may vary depending on the prior condition of the body and/or the grit blasting conditions. For transformation toughened ceramics containing tetragonal zirconia, the grit blasting preferably results in a surface flexural strength increase of at least about 10%, more preferably at least about 20%.

The following examples are provided to further illustrate the invention. The invention is not limited to the specific details of the examples.

EXAMPLE 1

42 bars of Zirconia toughened alumina (ZTA) were prepared as follows: 67 g $Al_2O_3$ powder and 33 g tetragonal zirconia powder (TZP) were dry milled for 12 hours. The resulting mixture was slurried with an organic binder, and then the slurry was spray dried. The resulting powder was pressed into bars which were fired at 1550° C.

14 of the bars were grit blasted for about one minute average over the surface. The blasting was done with 50 micron alumina grains at a pressure of about 85–90 psi and feed rate of about 1.4 lbs./min for a dispersion area of about 2 $in^2$.

A second set of 14 bars from the group were blasted under identical condition except for an average of two minutes blasting time. The remaining 14 bars were kept in their as fired condition.

All 42 bars were then tested for Modulus of Rupture (MOR) i.e. flexural strength, using a three point bend test. The as fired bars showed an average MOR of about 84.3 KSI. The bars blasted for one minute had an average MOR of about 88.8 KSI whereas the bars blasted for two minutes showed 94.6 KSI. Thus, the flexural strength of the ZTA was increased by about 12.2% as a result of the grit blasting.

EXAMPLE 2

39 bars of tetragonal zirconia (TZP) were prepared as follows: Calcined TZP powder was dry milled and slurried with organic binder. The slurry was spray dried, and the resultant powder was pressed into bars. The bars were then fired at 1550° C.

The fired bars were divided into three groups of 13. Two groups were treated by grit blasting with 36 grit (580 micron) silicon carbide particles at 50 psi for one and two minutes respectively. The feed rate was about 1.4 lbs/min. for a dispersion area of about 2 $in^2$.

The as fired bars had an MOR of 96.8 KSI. The bars blasted for one minute had an MOR of 115.0 KSI and the bars blasted for two minutes had an MOR of 117.2 KSI. Thus, the TZP bars blasted for two minutes showed a 21% increase in flexural strength.

What is claimed is:

1. A method of increasing flexural strength of a transformation-toughened ceramic body, said method consisting essentially of grit blasting at least a portion of the surface of said body thereby increasing said flexural strength.

2. The method of claim 1 wherein substantially the entire surface of said body is subjected to said grit blasting.

3. The method of claim 1 wherein said body contains tetragonal zirconia.

4. The method of claim 1 wherein said grit comprises particles selected from the group consisting of alumina particles and silicon carbide particles.

5. The method of claim 4 wherein said grit comprises alumina particles having an average particle size of about 25–600 microns.

6. The method of claim 5 wherein said particle size is about 50 microns.

7. The method of claim 1 wherein said grit blasting comprises propelling grit particles at said surface under a propelling pressure of about 40–100 psi.

8. The method of claim 7 wherein said pressure is about 85–90 psi.

9. The method of claim 4 wherein said grit comprises silicon carbide particles.

10. The method of claim 7 wherein said pressure is about 45–55 psi.

11. The method of claim 6 wherein said particles are propelled at a feed rate of about 1–2 lbs/min.

12. The method of claim 11 wherein said blasting is performed for about 30 seconds – 3 minutes average for said portion of surface blasted.

13. The method of claim 12 wherein said blasting is performed for an average of about 1–2 minutes.

14. The method of claim 1 wherein said flexural strength of the body is increased by at least about 10% by said blasting.

15. The method of claim 3 wherein said body consists essentially of tetragonal zirconia.

16. The method of claim 3 wherein said body consists essentially of tetragonal zirconia particles in a ceramic matrix.

17. The method of claim 16 wherein said matrix comprises a ceramic material selected from the group consisting of cubic zirconia and alumina.

* * * * *